United States Patent [19]

Omata

[11] Patent Number: 4,638,528
[45] Date of Patent: Jan. 27, 1987

[54] OIL TYPE DAMPER

[75] Inventor: Nobuaki Omata, Yokohama, Japan

[73] Assignee: Nifco Inc., Awa, Japan

[21] Appl. No.: 488,470

[22] Filed: Apr. 25, 1983

[30] Foreign Application Priority Data

Jun. 12, 1982 [JP] Japan .............................. 57-86756[U]

[51] Int. Cl.$^4$ .............................................. E05F 5/02
[52] U.S. Cl. ........................................ 16/82; 16/51; 16/DIG. 9
[58] Field of Search ............. 16/82, 51, 86 B, DIG. 9, 16/DIG. 21; 188/290, 306, 276

[56] References Cited

U.S. PATENT DOCUMENTS

| 3,861,503 | 1/1975 | Nash | 188/290 X |
| 3,882,976 | 5/1975 | Nash | 188/306 |
| 4,342,135 | 8/1982 | Matsuo et al. | 16/82 |
| 4,426,752 | 1/1984 | Nakayama | 188/290 X |

Primary Examiner—Donald R. Schran
Assistant Examiner—James Wolfe

[57] ABSTRACT

An oil type damper comprises a housing formed of a basic member in the shape of a blind tube and a cap, a rotating member and a braking disc adapted to rotate jointly and accommodated within the housing, viscous oil applied to the braking disc, and at least one flexible membrane opposed to the braking disc so as to allow the braking disc to be sealed in the housing as covered with the oil. In this oil damper, when the oil serving to brake the rotary motion of the rotating member connected to a given door expands in volume because of rising temperature, the flexible membrane is deformed under the pressure of the expanded oil enough to absorb the voluminal expansion of the oil and prevent otherwise possible leakage of the oil from the housing.

7 Claims, 4 Drawing Figures

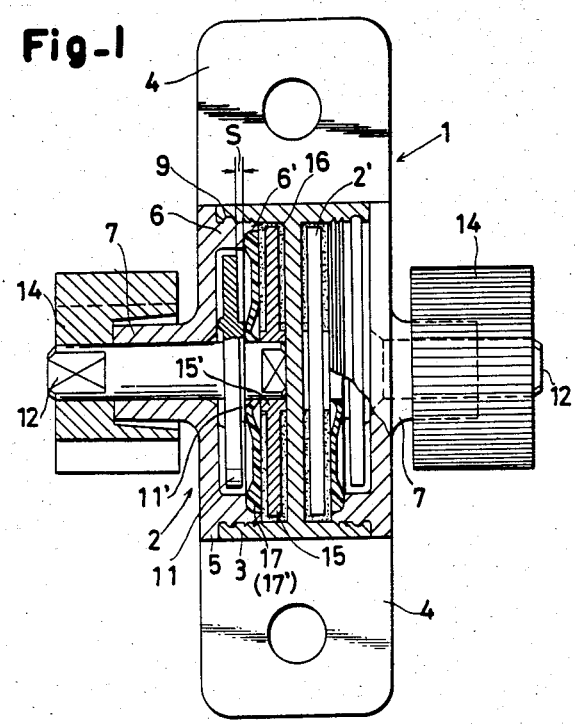
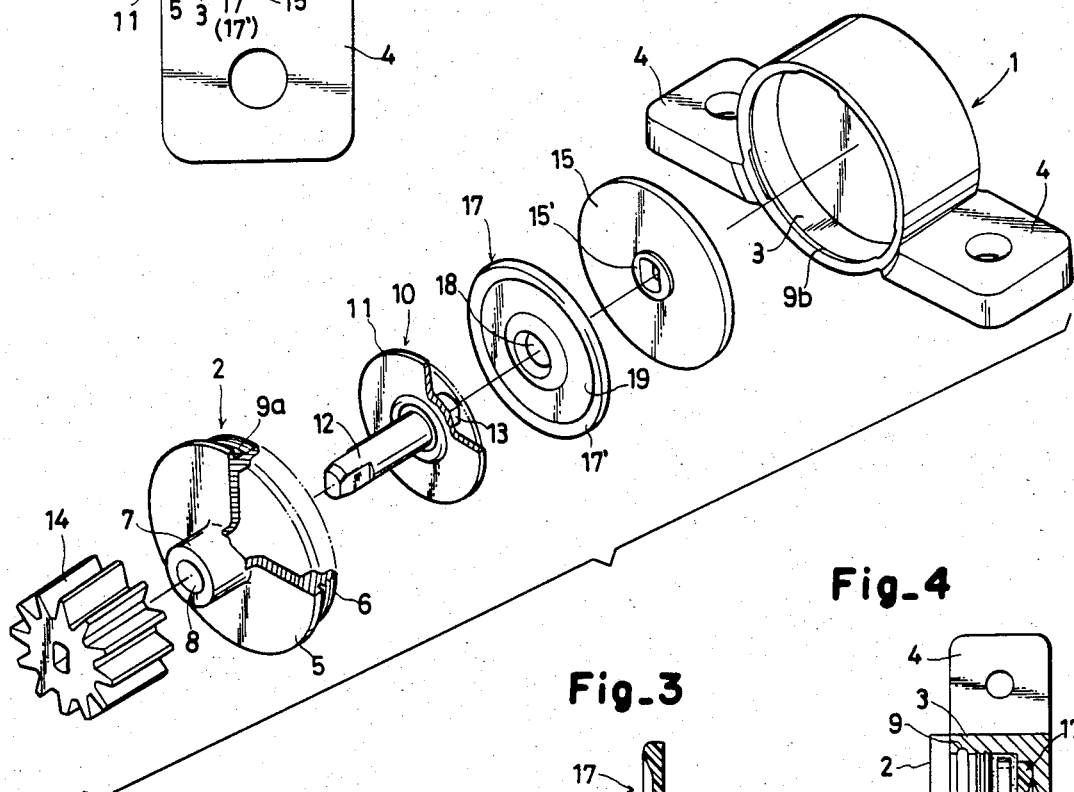
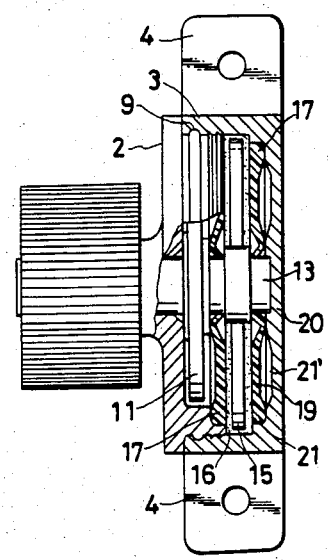

OIL TYPE DAMPER

BACKGROUND OF THE INVENTION

This invention relates to an oil type damper for braking the opening or closing motion of a lid or the like.

In an automobile, for example, a push given to a button causes a retractable ash tray to slide out to its service position or the closed lid of a glove compartment to pop out and provide access to the interior of the glove compartment. In a video cassette tape recorder, a similar push to a button causes a cassette tape holder in its concealed position to rise and come into sight out of the housing of the video set. For the purpose of braking the aforementioned sudden motion of a closed component in a retractable device, there has been proposed a frictional damper (Japanese Patent Application Disclosure No. Sho 55(1980)-75805) or an oil type damper (U.S. Pat. No. 4,342,135), for example. The frictional damper entails problems such as difficulty in providing a smooth braking motion, an awkward sensation to the user's finger placed on the button, and gradual degradation of performance during the course of prolonged service. Although the oil type damper does not encounter the problems inherent in the frictional damper, it nevertheless suffers from a peculiar problem of its own, namely, a problem arising from the use of oil. In the oil type damper, silicone grease having high viscous resistance is generally used as the oil in an amount of about 0.15 g. The silicone grease has a very high thermal expansion coefficient and its volume increases at the rate of 0.1% per degree Centigrade. If the temperature of the oil type damper in service happens to rise, therefore, the silicone grease may be expanded so much as to leak through the fine gap between the shank of a rotary member passing through the wall of the housing and the hole in the wall or through the fine gap between the case constituting the housing and the lid formed in the case. Once this leakage occurs, the oil type damper may possibly be deprived of its function totally or partially owing to the resultant shortage of silicone grease. To avoid this trouble, there has been developed a device for securing a tight seal between the case and the lid by the use of an ultrasonic welder. Since the case and the lid are both made of plastic, they are expanded in volume because of the elevation of temperature by the heat from the welder, with the result that the space left for accommodating the oil is decreased so much as to squeeze out the oil. Thus, this device fails to prevent the leakage of oil after all.

SUMMARY OF THE INVENTION

An object of this invention is to provide an oil type damper which prevents the oil sealed in an oil reservoir within the housing thereof from leaking out of the oil reservoir even when the oil is expanded by an elevation of the temperature thereof and which permits the braking effect of the oil damper upon a door or other similar device to be retained intact even during the course of the damper's prolonged service.

To accomplish the object described above according to the present invention, there is provided an oil type damper which comprises a housing, a rotating member having shafts perpendicularly raised one each from the opposite sides thereof, a braking disc secured to one of the shafts of the rotating member and contained within the housing, and two flexible membranes (or one flexible membrane) held fast on the shafts (or one of the shafts) of the rotating member as opposed across a space filled with viscous oil to the two (or one of the two) opposite sides of the braking disc.

The flexible membranes disposed as opposed to the opposite sides of the braking disc are formed of a flexible, elastic material. When the oil retained in conjunction with the braking disc within the housing is thermally expanded by some cause or other, therefore, the flexible membranes will absorb the thermal expansion of the oil and consequently prevent the expanded oil from leaking out of the housing. Owing to this effective prevention of oil leakage, the oil type damper of this invention retains its function intact during the course of prolonged service thereof. The housing consists of a basic member and a cap, and can be easily assembled by simply bringing the cap into snapping engagement with the basic member while the disc, the flexible membranes, and the rotating member are held in position within the basic member. Thus, the oil type damper of this invention enjoys high fabricability.

The other objects and characteristic features of this invention will become apparent to those skilled in the art as further disclosure is made in the following description of a preferred embodiment of the invention, as illustrated in the accompanying drawings.

BRIEF EXPLANATION OF THE DRAWINGS

FIG. 1 is a sectioned view illustrating one typical damper of the present invention in an assembled state.

FIG. 2 is an exploded perspective view of the damper of FIG. 1.

FIG. 3 is a sectioned view of a flexible membrane.

FIG. 4 is a sectioned view illustrating another typical damper of the present invention in an assembled state.

DESCRIPTION OF THE PREFERRED EMBODIMENTS

This invention relates to an oil type damper which does not allow the oil sealed in the interior of the housing thereof to leak out of the housing. In the drawings, 1 and 2 denote respectively a basic member and a cap which are both made of plastic and which are adapted to form a housing jointly. The basic member 1 is composed integrally of a tubular wall 3 having one closed end and a fitting piece 4 extended outwardly from the tubular wall 3 and adapted to be fastened to the device which the damper is intended to serve. The cap 2 comprises a lid wall 5 adapted to come into fast contact with the open edge of the tubular wall 3, a fitting wall 6 projected perpendicularly from the inner side of the lid wall 5 and adapted to be fitted on the inner surface of the tubular wall 3 to a depth about one half the entire axial length of the tubular wall, and a boss 7 projecting outwardly from the center of the outer surface of the lid wall in the axial direction thereof. A continuous central hole 8 is pierced through the lid wall 5 and the boss 7.

On the inner surface of the tubular wall 3 and the outer surface of the fitting wall 6, there are respectively provided an annular groove 9b and an annular protuberance 9a which come into mutual snapping engagement when the fitting wall 6 is driven in along the inner surface of the tubular wall until the lid wall 5 collides with the inner surface of the closed end of the tubular wall. Thus, the annular protuberance 9a and the annular groove 9b jointly form snapping engagement means 9 for the tubular wall 3 and the fitting wall 6.

By 10 is denoted a rotating member. In the present invention, the rotating member 10 comprises a disc 11 and two shafts 12, 13 which perpendicularly rise from the centers of the opposite sides of the disc 11. The first shaft 12 is passed through a central hole 8 of the cap 2 from the inner side of the cap 2 and thrust out of the leading end of the boss 7. A toothed wheel 14 is fastened to the end of the shaft 12 protruding from the boss 7. The diameter of the disc 11 is slightly smaller than the inside diameter of the fitting wall 6. Around the second shaft 13, a braking disc 15 having a hole perforated therein is fitted so as to be rotated about its axis in concert with the shaft 13. An oil 16 such as silicone grease is applied as with a brush to the opposite surfaces and the circumferential surface of the braking disc 15. The braking disc thus coated with the oil 16 is accommodated within the tubular wall 3 of the basic member as opposed to the bottom (closed end) of the tubular wall 3.

This invention contemplates having a soft, elastic flexible membrane 17 secured to the shaft 13 as opposed to the braking disc 15, so that when the oil 16 adhering to the braking disc 15 is thermally expanded, the flexible membrane 17 may be pushed out and deformed because of the increased volume of the oil to a great enough extent to absorb the voluminal expansion of the oil. Preferably this flexible membrane is formed in a small wall thickness with synthetic rubber or soft plastic such as, for example, polyethylene or polypropylene which is a material of small thermal deformation. Along the inner surface of the flexible membrane, there is formed an annular lip 18 which is adapted to seal the shaft 13 by coming into intimate contact with the outer surface of the shaft 13 and consequently prevent the oil from flowing along the periphery of the shaft and leaking to the disc 11 side.

In the present embodiment, the fitting wall 6 of the cap 2 is provided on the inner surface towards the leading end thereof with a step 6' formed annularly. A peripheral portion 17' of the flexible membrane 17 is fitted to the annular step 6'. The flexible membrane used in the present embodiment is so shaped that the side thereof opposed to the braking disc 15 is substantially flat as far as the annular lip 18 on the inner surface thereof and the other side thereof opposed to the disc 11 is depressed halfway between the circumference and the annular lip 18 to give rise to an annular recess 19.

Typically the flexible membrane is about 14 mm in diameter, about 11 mm in outside diameter and about 7 mm in inside diameter respectively of the annular recess, 0.8 mm in thickness along the circumferential portion, 0.3 to 0.5 mm in depth of the annular recess, and 0.5 to 0.3 mm in wall thickness at the bottom of the annular recess. The annular lip 18 inwardly comes into contact with the periphery of the shaft 13 and axially comes into contact with the annularly raised portions 11', 15' formed in the centers respectively of the disc 11 and the braking disc 15. Consequently, the flexible membrane is allowed to maintain a fixed interval S from the disc 11.

Assemblage of the damper constructed as described above is accomplished by causing the shaft 12 of the rotating member 10 to pass through the central hole 8 from inside the cap 2 and protrude from the leading end of the boss 7, fitting the flexible membrane 17 and the braking disc 15 around the other shaft 13, applying silicone grease to the braking disc 15, then driving the fitting wall 5 of the cap 2 in along the inner surface of the tubular wall 3 of the basic member 1 as already described, and fastening to the leading end of the shaft 12 the toothed wheel 14 to be meshed with a rack, a sectorial gear, or a toothed wheel adapted to be moved in concert with a lid, for example. Consequently, the rotating member 10 is freely rotated about its axis as held in position by the central hole 8. This rotation of the rotating member 10, however, is braked by the viscous resistance of the oil 16 adhering to the braking disc and filling the cavity defined by the bottom 2', the inner surface of the tubular wall 3, and the side of the flexible membrane 17 opposed to the braking disc, with the result that the motion of a lid, a cassette holder, or an ash tray will be damped. When the oil 16 is expanded in volume owing to an increase in the temperature of the ambient air, the flexible membrane 17 is bulged in the direction of the disc 11 by the pressure of the expanded oil. Since the expansion of the oil is absorbed by the flexible membrane 17, the oil does not leak from the housing.

The housing retains therein a fixed amount of the oil at all times as described above. The damper of the present invention, therefore, retains its function intact for a long time unlike the conventional damper which loses the oil because of leakage caused when there is an increase in the temperature of the ambient air and, afterwards, fails to provide sufficient braking force when there is a decrease in the temperature. Besides, the housing can be readily assembled by the snapping engagement means 9 which only requires the annular protuberance 9a on the outer surface of the fitting wall 6 to be pushed into the annular groove 9b on the inner surface of the tubular wall 3 as illustrated in the drawing. The damper of this invention has no need for such troublesome means of union as an ultrasonic welder and, accordingly, enjoys notably high productivity.

In the conventional damper, the amount of the oil applied to the braking disc has been limited to about 70 to 80% of the inner volume of the cavity left within the housing to be filled with the oil in due consideration of the voluminal expansion of the oil due to an elevation of the temperature of the oil. Thus, the conventional damper has suffered possible dispersion, though very slight, of the braking force. In contrast, in the damper of the present invention, since the flexible membrane is deformed by the pressure of the oil enough to absorb the voluminal expansion of the oil, the amount of the oil applied to the braking disc is constant, namely, 100% of the inner volume of the cavity. Thus, this damper provides uniform braking force.

From the construction of the present embodiment in which the toothed wheel 14 is attached to the leading end of the shaft 12 protruding from the boss 7 as indicated above, there is derived the advantage that the toothed wheel may be adapted to fit a device with which the damper is to be coupled so as to satisfy the requirements for that device. The external periphery 17' of the flexible membrane 17 is simply fitted to the step 6' formed on the inner surface of the fitting wall 6. Optionally, the external periphery 17' may be adapted to be nipped between the fitting wall and the basic member and extended backwardly from the external periphery of the flexible membrane so as to prevent oil leakage with increased certainty.

The annular lip 18 formed along the inner surface of the flexible membrane is bent as illustrated in the drawing. When the oil expands in volume, the pressure of the expanded oil pushes this annular lip 18 and stretches it out of its bent shape. Consequently, the annular lip 18 is pressed against the outer surface of the shaft 13. Because of this tight contact of the annular lip 18 with the shaft 13, possible leakage of the oil through the interface between the annular lip and the shaft 13 is substantially precluded. If a very small portion of the oil should leak through this interface, this small amount of oil manifests the effect of a damper between the disc 11 and the annular lip 18. Thus, the total braking force provided by the damper as a whole is unchanged by this minute leakage.

In the embodiment illustrated in FIG. 1 and FIG. 2, the basic member 1 has two tubular walls 3 extended in the opposite directions from one common bottom (closed end). These tubular walls are each provided with a rotating member and a flexible membrane and closed with a cap. Thus, two dampers are integrally formed. This dual damper is suitable for incorporation into a cassette recorder of the type having two cassette holders juxtaposed to each other for the purpose of tape dubbing, so that the dampers may be used for severally braking the independent motions of the two cassette holders. The present invention need not be limited to this particular construction but may be embodied similarly in a construction in which the basic member comprises only one tubular wall having one closed end as illustrated in FIG. 4.

In the embodiment of FIG. 4, the basic member 1 is provided in the bottom 20 thereof with a circular depression. Another flexible membrane 17 is fitted into this circular depression and, hence, opposed to the flexible membrane 17 fitted to the step 6' on the inner surface of the fitting wall. When the oil expands in volume, therefore, the flexible membrane 17 is deformed until the annular recess 19 of the flexible membrane 17 protruding from the bottom side of the depression 21 collides with the bottom surface of the depression. Thus, the voluminal expansion of the oil is absorbed by the flexible membrane 17.

In this embodiment, the two opposed flexible membranes are capable of jointly absorbing the voluminal expansion of the oil. When an annular recess 21' opposed to the annular recess 19 of the flexible membrane is further formed in the bottom of the depression 21, the extent to which the damper is capable of absorbing the voluminal expansion of the oil will be further increased.

In the case of a damper of the construction having the wall of the housing interposed between the disc 11 and the braking disc 15 as disclosed in the prior invention of U.S. Pat. No. 4,342,135, therefore, the present invention may be embodied by having the flexible membrane fitted into the depression formed in the bottom so as to absorb the voluminal expansion of the oil. When the tubular wall 3 is provided at the center of the bottom 20 thereof with a blind hole as in the present embodiment and this blind hole is used for admitting the leading end of the shaft 13, exact coincidence can be established between the axis of the rotating member and that of the housing. Although the disc 11 is effective in preventing the oil leakage by lengthening the path for possible oil leakage in a zigzagging pattern, it is not necessarily an indispensable component for the damper of this invention and may be omitted when desired. When the disc 11 is omitted, the annular lip 18 of the flexible membrane may be received fast on the inner end surface of the cap 2.

What is claimed is:

1. An oil type damper, including:

a housing having a cylindrical chamber open at one end, a centrally apertured cap for closing said chamber, a flexible membrane positioned intermediate the ends of said chamber for dividing said cylindrical chamber into two compartments and including a centrally located aperture having a flexible annular lip, a shaft liquid-tightly extending through said annular lip and having one end of said shaft projecting out of said housing through said centrally aperture cap, said shaft having means for transmitting rotational force fixed to said one end thereof, a braking disc contained within one of said compartments which is filled with oil, said disc fixed to rotate in concert with said shaft on one side of said membrane and a rotating member fixed to said shaft on the opposite side of said membrane and contained within the other of said two compartments, said member adapted to rotate in concert with said braking disc, said rotating member and said braking disc being in confining contact with adjacent edges of the annular lip therebetween and caused to pinch said annular lip of said flexible membrane against said shaft said flexible membrane being fixed relative to said housing while said shaft rotates relative to said membrane.

2. An oil type damper according to claim 1 wherein said housing includes a pair of coaxial cylindrical chambers opening outwardly in opposite directions and sharing a common bottom, each of said chambers including all of the elements set forth herein before for the single chamber.

3. An oil type damper of the type according to claim 1 wherein said cap is provided with a threaded extension mating with complementary threads on the interior of the open end of said cylindrical chamber, said cap further including a recess portion at its free extremity extending into said chamber, and adapted to cooperatively accept an annular protuberance on said membrane and to secure same therein against rotation with the annular lip projecting axially in a direction opposite to said protuberance for contacting the said braking disc.

4. An oil type damper according to claim 1 wherein said flexible membrane is provided with an annular recess on the side thereof opposed to said braking disc for absorbing volume expansion of the oil.

5. An oil type damper according to claim 1 wherein the tubular wall of said chamber is extended in one direction from said bottom and a second flexible membrane is disposed between the braking disc and said bottom.

6. An oil type damper according to claim 1 wherein the rotating member and braking disc are provided with annular raised portions around the centers thereof to contact the adjacent edges of the annular lip of the membrane and space the membrane from the rotating member for permissive movement of the membrane under oil expansion on the opposite side thereof.

7. An oil type damper according to claim 1 wherein said housing comprises a second chamber extending oppositely from said first mentioned chamber and separated therefrom by a common wall, a second centrally apertured cap for closing said second chamber, a second flexible membrane positioned intermediate the ends of said second chamber for dividing said second chamber into two compartments and including a centrally located aperture having a flexible annular lip, a second shaft liquid-tightly extending through said last-mentioned annular lip and having one end of said second shaft projecting out of said housing through said second apertured cap, said second shaft having second means for transmitting rotational force fixed to said one end thereof, a second braking disc contained within one of said last mentioned compartments which is filled with oil, said second disc fixed to rotate in concert with said second shaft on one side of said second membrane and a second rotating member fixed to said second shaft on the opposite side of said second membrane and contained within the other of said last mentioned two compartments, said second rotating member and said second braking disc being in confining contact with adjacent edges of the annular lip of the second flexible membrane therebetween and caused to pinch said last-mentioned annular lip of said second flexible membrane against said second shaft, said second flexible membrane being fixed relative to said housing while said second shaft rotates relative to said second membrane.

* * * * *